United States Patent
Panpaliya et al.

(10) Patent No.: US 8,755,742 B2
(45) Date of Patent: Jun. 17, 2014

(54) METHOD AND SYSTEM FOR PEER TO PEER WIDE AREA NETWORK COMMUNICATION AMONG RADIO SITES HAVING DYNAMIC REST CHANNEL BASE REPEATER STATIONS

(75) Inventors: Satyanarayan R. Panpaliya, Palatine, IL (US); Dipendra M. Chowdhary, Hoffman Estates, IL (US); Tejal S. Patel, Schaumburg, IL (US); David G. Wiatrowski, Woodstock, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 425 days.

(21) Appl. No.: 13/253,132

(22) Filed: Oct. 5, 2011

(65) Prior Publication Data
US 2013/0090056 A1 Apr. 11, 2013

(51) Int. Cl.
*H04B 7/14* (2006.01)
*H04W 84/04* (2009.01)
*H04B 7/155* (2006.01)
*H04W 76/00* (2009.01)

(52) U.S. Cl.
CPC ......... *H04W 84/047* (2013.01); *H04B 7/15507* (2013.01); *H04B 7/15542* (2013.01); *H04W 76/005* (2013.01)
USPC ................ 455/15; 455/11.1; 455/7; 455/518; 455/519; 455/520; 370/315; 370/327; 370/340; 370/341; 370/329

(58) Field of Classification Search
CPC . H04W 84/08; H04W 84/047; H04W 76/005; H04B 7/155; H04B 7/15542; H04B 7/15507
USPC ............... 455/15, 7, 11.1, 13.1, 16, 500, 517, 455/509, 518, 519, 520, 403, 422.1, 455/414.1–414.4, 426.1, 426.2; 370/310, 370/315, 322, 327, 328, 329, 338, 343, 340, 370/341
See application file for complete search history.

(56) References Cited

U.S. PATENT DOCUMENTS

| | | | |
|---|---|---|---|
| 5,901,341 A * | 5/1999 | Moon et al. ................. | 455/9 |
| 7,813,327 B2 | 10/2010 | Logalbo et al. | |
| 2003/0207690 A1 | 11/2003 | Dorenbosch | |
| 2010/0087199 A1 | 4/2010 | Chowdhary et al. | |

FOREIGN PATENT DOCUMENTS

| WO | 2009148775 A1 | 12/2009 |
|---|---|---|
| WO | 2010039633 A2 | 4/2010 |

OTHER PUBLICATIONS

PCT International Search Report Dated Nov. 29, 2012 for Counterpart Application PCT/US2012/057095.

* cited by examiner

*Primary Examiner* — Keith Ferguson
(74) *Attorney, Agent, or Firm* — Daniel R. Bestor

(57) ABSTRACT

A new group call request is received from a subscriber station at a rest channel repeater at a first network location. Corresponding new group call notifications are then transmitted to each of the other network locations over a wide area network to a current one of the repeaters acting as a rest channel repeater at each of the other network locations. Subsequently, an identity of a traffic channel repeater hosting the new call is received from each of the respective other network locations. An over-the-air notification is transmitted to other subscriber stations at the first network location identifying one of the first rest channel and another available channel as a channel for the new group call. Data received from the first subscriber station is then forwarded to each of the identified traffic channel repeaters at each of the other network locations via the wide area network.

20 Claims, 9 Drawing Sheets

METHOD AND SYSTEM FOR PEER TO PEER WIDE AREA NETWORK COMMUNICATION AMONG RADIO SITES HAVING DYNAMIC REST CHANNEL BASE REPEATER STATIONS

FIELD OF THE DISCLOSURE

The present disclosure relates generally to wireless communication systems and more particularly to peer to peer wide area network communications having dynamic rest-channel base repeater stations.

BACKGROUND

A wide area network (WAN) is a network which covers a large geographical area, and use communications circuits and systems to connect the network nodes. "Wide area" coverage is defined by a number of base repeater stations which are typically distributed geographically over a large area and are connected over a wired or wireless network. Often these stations are distributed in such a way that no one station could cover the same geographic area by itself (however this isn't always the reason for such a wide area network). This enables a first mobile wireless subscriber station within coverage of a first fixed base repeater station to communicate with other (second, third, etc.) subscriber stations within coverage of remote (second, third, etc.) base repeater stations.

Wireless wide area networks may utilize communication technologies such as WIMAX (Worldwide Interoperability for Microwave Access), UMTS (Universal Mobile Telecommunications Service), GPRS (General Packet Radio Service), CDMA (Code Division Multiple Access), GSM (Global System for Mobile communications), CDPD (Cellular Digital Packet Data), HSDPA (High-Speed Downlink Packet Access), 3G (third generation), 4G (fourth generation), and the like, to transfer data. Wired wide area networks may utilize Data Over Cable Service Interface Specifications (DOCSIS), Digital subscriber line (DSL), Canopy, Ethernet, T1, or the like to transfer data.

Within a wide area network, a variety of communication scenarios can co-exist. For example, one use of the wide area network is to enable a group call (i.e. one subscriber station transmitting to many subscriber stations who are listening).

One common wide area network over which group calls (i.e., a one-to-many call) can be sent is the Public Internet. The Internet is a worldwide, publicly accessible series of interconnected computer networks that transmit data by packet switching using the standard Internet Protocol (IP). It is a "network of networks" that consists of millions of smaller domestic, academic, business, and government networks, which together carry various information and services.

One typical way of providing group communications amongst subscriber stations is to implement a trunked radio communications system. In a trunked radio communications system, subscriber stations use a pool of channels that are assigned on an as-needed basis for new talkgroup calls. Thus, all talkgroups are served by all channels. The trunked radio system takes advantage of the probability that not all talkgroups need a channel for communication at the same time. Estimates are made about how much load a typical user presents to the system in terms of calls per hour and duration of each call. For a traffic load, fewer channels are required since all talkgroups are served by all channels. Combining this with the number of users on the system, and the acceptable quality of service (QoS), determines how many trunked channels are required to satisfactorily serve the number of users. With a given number of channels, a much greater number of talkgroups can be accommodated as compared with conventional radio systems. Hence, a primary purpose of a trunked radio system is the efficient utilization of channels allowing for more users to carry many conversations over a fewer number of distinct channels.

A trunked radio system can be either a centralized trunked radio system or a decentralized trunked radio system. A centralized trunked radio system uses a dedicated or exclusive controller that assigns traffic channels upon request. Other terms that sometimes refer to the central controller include trunking controller, site controller, resource allocator, channel allocator, controller, and other like terms. The subscriber stations constantly monitor a control channel for channel assignment instructions from the central controller. In order to start a group call, a subscriber station requests that a channel be allocated for its use, and the central controller transmits instructions telling the subscriber stations in the group to switch to a traffic channel assigned for that call.

A decentralized trunked radio system, however, does not require the use of an exclusive controller. The intelligence or control function for assignment of a channel to a call is distributed amongst base repeater stations and/or subscriber stations in the wireless communications network. For example, in one case one of the base repeater stations out of the plurality of base repeater stations may be designated a rest channel repeater, and all subscriber stations will idle on the channel assigned to the rest channel repeater (the rest channel) and monitor the rest channel for new calls. Requests to start a new call will be received by the rest channel repeater and assigned a traffic channel. All subscriber stations wishing to participate in the new call will then move to the new traffic channel for the call, and once completed, return to the rest channel. The particular repeater designated as a rest channel repeater may change from time to time, perhaps due to detected interference and/or start-up rest channel arbitration procedures between repeaters at a radio site.

In another case, a new call request received at a rest channel repeater will be assigned to the current rest channel as the traffic channel for the new call. In this case, instead of those subscriber stations not participating in the new call remaining on the rest channel, those subscriber stations not participating in the new call move to a new rest channel while those subscriber stations wishing to participate in the new call remain on the old rest channel (which has now become a traffic channel for the new call). The new rest channel may be assigned and/or detected in a number of different ways.

Because the rest channel at a decentralized trunked radio system may change over time, it becomes difficult to conduct and manage group calls between multiple decentralized trunked radio sites over a wide area network. Accordingly, there is a need for a method and system for enabling simple, low cost wide area network (WAN) group communications between multiple decentralized trunked radio sites having dynamic rest channels.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
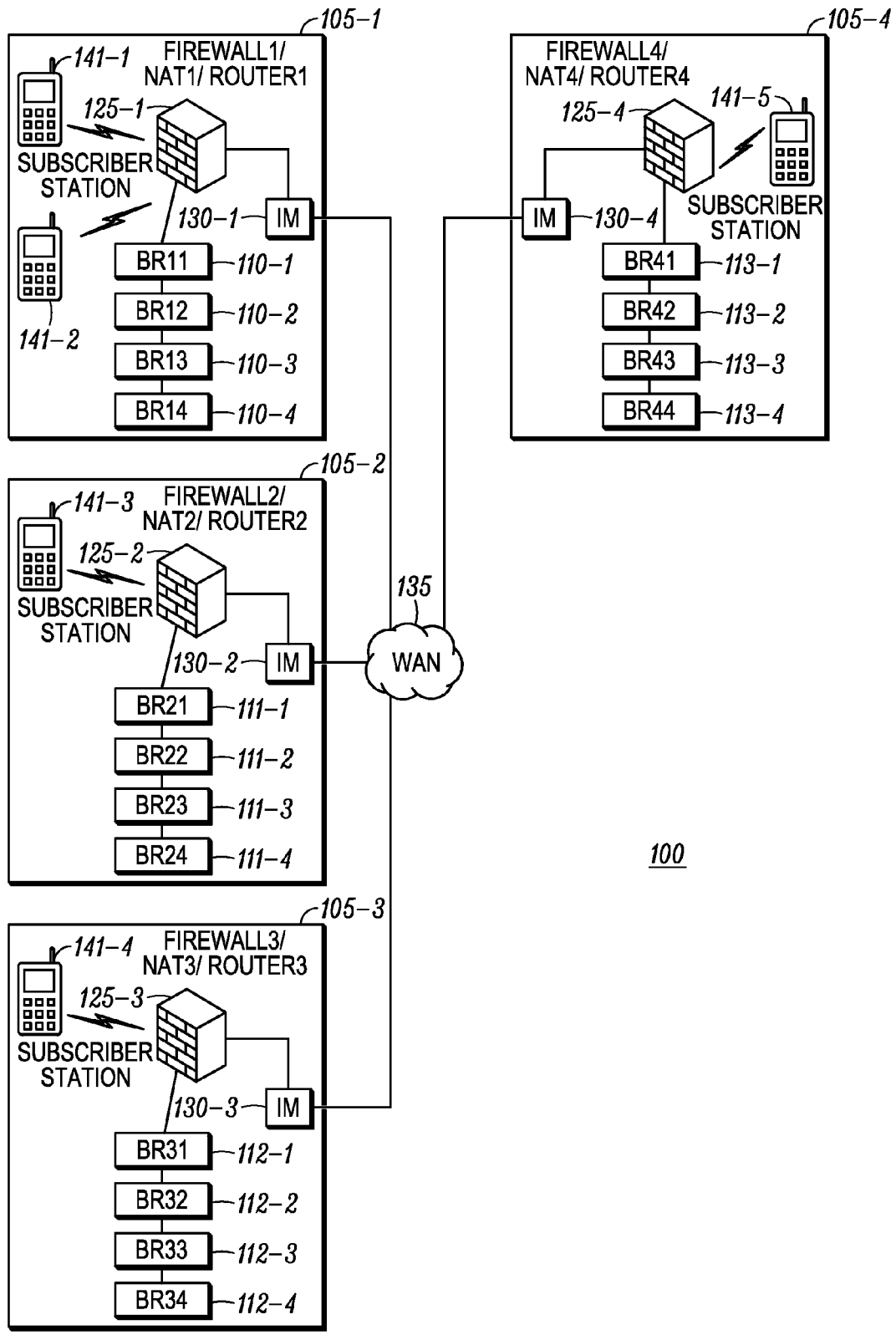
FIG. 1 is a block diagram of an example of multiple decentralized trunked radio sites having dynamic rest channels connected via a wide area network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides for the interconnection of multiple decentralized trunked radio sites over a wide area network such as the Internet. Each radio site operates as a peer within a peer to peer (P2P) topology where the "Peers" talk directly without go-betweens or other centralized and/or intervening control structures or entities. Peer-to-peer is a communications model in which each party has the same capabilities and either party can initiate a communication session. The present disclosure provides for a peer to peer interconnected network of base repeater stations at decentralized trunked communication sites having dynamic rest channels.

A topology which utilizes direct network links between base repeater stations rather than to a centralized controller minimizes the higher delay imparted by the Public Internet and also minimizes cost to the customer and service provider. Because a rest channel and/or traffic channel used at decentralized trunked radio sites for particular group calls may change over time, the P2P WAN topology must support the sharing and identification of rest channel and/or traffic channel information between the decentralized trunked radio sites, and must support the variable redirection of new group call information to a dynamic current rest channel repeater at each decentralized trunked radio site.

I. System Architecture

FIG. 1 is a block diagram of an example wide area network connected system of decentralized trunked radio sites 100 having dynamic rest channels in accordance with some embodiments of the present invention. As illustrated, the system 100 includes a plurality of decentralized trunked radio sites 105-n, each geographically separated from the other radio sites. For example, radio site 105-1 can be in Japan, radio site 105-2 can be in the United Kingdom, radio site 105-3 can be Columbia, and radio site 105-4 can be the United States. Of course, each of the plurality of network locations 105-n can be located anywhere within the terrestrial earth; and further can be near or far from the other network locations in accordance with the embodiments of the present disclosure. Within each radio site 105-n, an Internet Modem (IM) 130-n operatively couples each radio site 105-n to a wide area network (WAN) 135 such as the Internet. The IM 130-n may use a standard interface to an Internet provider (i.e. Data Over Cable Service Interface Specifications (DOCSIS), Digital subscriber line (DSL), Canopy, and the like). Although not illustrated in FIG. 1, in an alternate embodiment the radio sites 105-n can be connected to one another through T1's or other types of WANS in place of or in addition to the Internet 135.

A plurality of base repeater stations BR11 110-1 through BR14 110-4 are located at the first radio site 105-1, a plurality of base repeater stations BR21 111-1 through BR24 111-4 are located at the second radio site 105-2, a plurality of base repeater stations BR31 112-1 through BR34 112-4 are located at the third radio site 105-3, and a plurality of base repeater stations BR41 113-1 through BR44 113-4 are located at the fourth radio site 105-4. Each base repeater station 110-n through 113-n may be a base repeater station that is a mobile or fixed (non-mobile), full-duplex or half-duplex, radio frequency (RF) (wireless) modem that transmits and receives control and media (data/voice/video/images/text/etc) to and from one or more subscriber stations on one or more channels. RF resources being shared at radio sites are sometimes also referred to as channels. A channel in a frequency division multiple access (FDMA) system comprises a frequency, while a channel in a time division multiple access (TDMA) system comprises a frequency and a timeslot, and a channel in a code division multiple access (CDMA) system comprises a frequency and a code.

Each of the base repeater stations 110-n through 113-n at a particular radio site are interconnected via one or more wired or wireless connections, and are capable of sharing control and/or media information with one another. Each of the base repeater stations 110-n through 113-n at a particular radio site can receive control and/or media from the WAN 135 and repeat the information via a corresponding channel of the base repeater station, and can similarly receive control and/or media from a subscriber station and forward the information to other radio sites 105-n via WAN 135.

A Firewall/NAT/Router (FRN) 125-n is an internet protocol (IP) network device which has combined firewall/NAT/router functionality, located at each network location 105-n. For example, FRN1 125-1 is located at the network location 105-1, FRN2 125-2 is located at the network location 105-2, FRN3 125-3 is located at the network location 105-3, and FRN4 125-4 is located at the network location 105-4. Within each network location 105-n, one or more base repeater stations interfaces with the respective FRN device 125-n either directly or indirectly. The FRN 125 serves to provide a means of protection for the associated base repeater stations that are accessible via WAN 135 (including, in one embodiment, the Public Internet). A system topology where the units are connected over T1's or other types of WANs may not require FRNs. The FRNs can complicate WAN-wide group call functionality. For example, firewalls and many NATs don't allow unsolicited packets to be received from other hosts, computers, devices, etc. via a WAN 135 such as the Internet. In an embodiment of the present disclosure, each of the base repeater stations 110-*n* through 113-*n* is behind a FRN 125, which will block unsolicited packets unless a function is put into place to remedy the problem.

Note that the network topology of FIG. 1 is for illustrative purposes, and that the system 100 can alternatively include any combination of tiered base repeater stations, routers, switches, and consoles. Furthermore, more than four radio sites or less than four radio sites could be similarly supported based on the present disclosure. Finally, each radio site 105-*n* may include more or less than the four base repeater stations illustrated in an exemplary manner in FIG. 1. Other changes are possible as well.

Within each radio site 105-*n*, one or more subscriber stations 141-*n* can communicate through the respective base repeater stations to other subscriber stations within the system 100. For example, as illustrated in FIG. 1, subscriber stations 141-1 and 141-2 are located within radio site 105-1, subscriber station 141-3 is located within radio site 105-2, subscriber station 141-4 is located within radio site 105-3, and subscriber station 141-5 is located within radio site 105-4. Of course, more or fewer subscriber stations could be present at each radio site 105-*n*.

Figure 2:
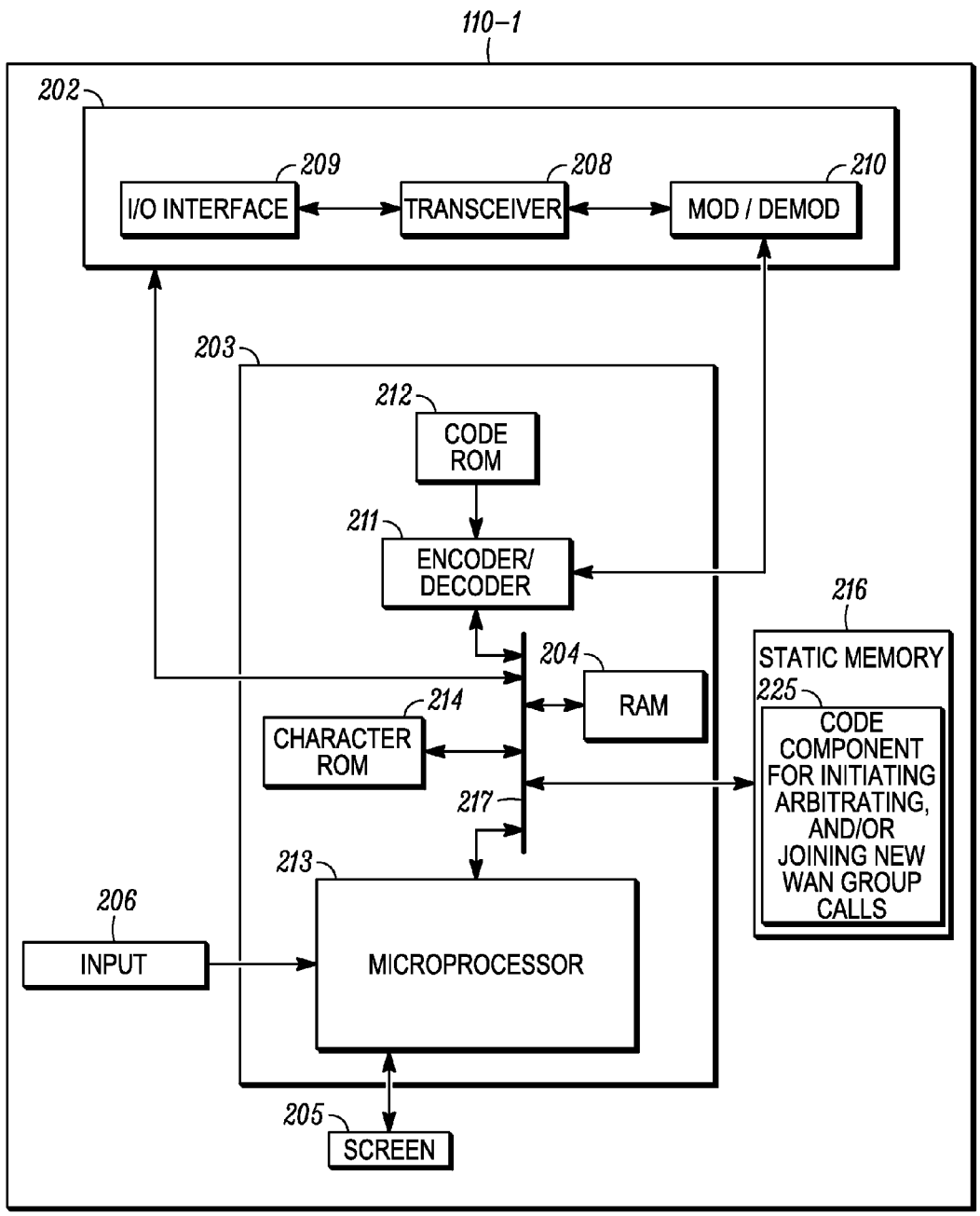
FIG. 2 is an example functional block diagram of a base repeater station operating within the network of FIG. 1 in accordance with some embodiments.

FIG. 2 is an example functional block diagram of a base repeater station BR11 110-1 operating within the system 100 of FIG. 1 in accordance with some embodiments. Other base repeater stations BR12 110-2 through 113-4 may contain same or similar structures. As shown in FIG. 2, base repeater station BR11 110-1 includes a communications unit 202 coupled to a common data and address bus 217 of a processing unit 203. The base repeater station BR11 110-1 may also include an input unit (e.g., keypad, pointing device, etc.) 206 and a display screen 205, each coupled to be in communication with the processing unit 203.

The processing unit 203 may also include an encoder/decoder 211 with an associated code Read Only Memory (ROM) 212 for storing data for encoding and decoding voice, data, control, or other signals that may be transmitted or received between other base repeater stations or subscriber stations in the same radio site 105-1 as base repeater station BR11 110-1, or perhaps between other base repeater stations in a remote radio site such as radio site 105-2. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include one or more wired or wireless input/output (I/O) interfaces 209 that are configurable to communicate with subscriber stations such as subscriber station 141-1, with other local base repeater stations such as base repeater station BR12 110-2, and with other remote base repeater stations such as base repeater station BR21 111-1. The communications unit 202 may include one or more transceivers 208, such as a Digital Mobile Radio (DMR) transceiver, a European Terrestrial Trunked Radio (TETRA) transceiver, a P25 or APCO-25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The communications unit 202 may additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network.

The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding or encoding data such as control channel messages and/or data or voice messages that may be transmitted or received by the base repeater station BR11 110-1. Static memory 216 may store operating code for the microprocessor 213 that initiates, arbitrates, and/or joins new WAN group calls. For example, in some embodiments of the present disclosure, static memory 216 may store operating code that, when executed by the microprocessor 213, perform the base repeater station methods and steps disclosed herein. In one example, operating code stored in the static memory 216 may, when executed by microprocessor 213, cause the base repeater station BR11 110-1 to, in response to receiving a new call request from a subscriber station, cause corresponding new group call notifications to be transmitted to a current rest channel repeater at each of the other radio sites 105-2, 105-3, and 105-4, receive from each of the other radio sites an identity of a traffic channel base repeater station that will be hosting the new call at each respective radio site, transmit an over-the-air notification to other subscriber stations at the radio site 105-1 on a first rest channel identifying one of the first rest channel and another available channel as a channel that is associated with the new group call, receive data associated with the new call from the first subscriber station, and transmit duplicates of the data to each of the identified traffic channel repeaters at each of the other radio sites via the WAN. Static memory 216 may additionally or alternatively store operating code that performs all of the functions of the one of the base repeater stations described with respect to FIGS. 4-6.

Static memory 216 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

In some embodiments, base repeater station BR11 110-1 may be configured to, or static memory 216 may contain operating code that, when executed by microprocessor 213, cause base repeater station BR11 110-1 to act as one or more of an intermediary base repeater station for radio site 105-1 and a site-wide intermediary for system 100.

More specifically, each radio site 105-*n* may include a base repeater station that is designated as an intermediary base repeater station for that respective radio site. For example, base repeater station BR21 111-1 may be designated an intermediary base repeater station for radio site 105-2, base repeater station BR32 112-2 may be designated an intermediary base repeater station for radio site 105-3, and base repeater station BR43 113-3 may be designated an intermediary base repeater station for radio site 105-4. The purpose of an intermediary base repeater station is to act as a "go to" repeater station for a particular radio site and is configured or provided with a static IP address. Each intermediary repeater station is then pre-configured with, or provided with during operation, fixed IP addresses of every other intermediary repeater station at the radio sites in the system 100. Furthermore, ports are opened in respective FNR's 125-*n*, and perhaps kept open via periodic keep-alive messages, so that intermediary base repeater stations are able to remain in contact with one another. When a new group call is initiated at a non-intermediary repeater station, (e.g., base repeater station 110-3 in radio site 105-1, hereinafter the "original source base repeater station"), the original source base repeater station 110-3 can forward the new group call request to the known intermediary repeater station BR11 110-1 at radio site 105-1, and rely upon the intermediary repeater station BR11 110-1 to forward the new group call information to other radio sites via the known IP addresses (stored at the intermediary base repeater station) of the respective intermediary base repeater stations at the other radio sites.

Once the forwarded new group call request is received at the intermediary base repeater station at each of the other radio sites, the respective intermediary base repeater stations can forward the new call information on to a current rest channel repeater at that site for further handling. The address of the original source base repeater station (e.g., base repeater station 110-3 in radio site 105-1 in this example) is included in the new group call information transmission so that future communications can be transmitted directly between the rest channel repeater and/or assigned traffic channel repeater at the other radio sites and the original source base repeater station. Ports may be opened in respective FNR's 125-n for the particular new group call (and perhaps kept alive via periodically transmitted keep-alive messages), and then closed after the call is completed, in order to maintain secure firewalls at each radio site. Each intermediary base repeater station may store the static IP addresses of each other intermediary base repeater station at the other radio sites, and may also store dynamic or static IP addresses of the other non-intermediary base repeater stations within the same radio site as the intermediary base repeater station.

If a non-intermediary base repeater station boots up or is re-connected after being disconnected from the radio site due to link fault, the non-intermediary base repeater station will "rendezvous" with the intermediary and register its source IP address and request the IP addresses of all other non-intermediary base repeater stations registered at the radio site. The intermediary may then forward the IP addresses of all other non-intermediary base repeater stations that are already registered with the intermediary.

In addition to local radio site intermediaries, one local radio site intermediary in the system 100 will also be designated a system intermediary. The system intermediary will maintain a static IP address and maintain a record of all local radio site intermediaries in the system 100 and a record of their respective IP addresses. When a new radio site is added to the system 100, a site intermediary base repeater station at the new radio site can then access the system intermediary and maintain an up-to-date list of static IP addresses of all other local radio site intermediaries, and can also register itself with the system intermediary. Once the new radio site registers its new local radio site intermediary with the system intermediary, update notices are sent out to all pre-existing local radio site intermediaries including the IP address of the new local radio site intermediary. Further examples of intermediary interactions will be set forth with respect to FIG. 5 below.

II. Decentralized Trunked Radio Site Operation

FIGS. 3a-3d provide examples of a decentralized trunked radio channel switching that may be implemented at radio sites 105-n. Two examples will be described with respect to FIGS. 3a-3d, including a first example in which subscriber stations idling on an initial designated rest channel are assigned a new traffic channel for a new group call while remaining subscriber stations stay on the initial designated rest channel, and a second example in which subscriber stations idling on an initial designated rest channel remain on the initial designated rest channel (which is converted to a traffic channel for the new group call) while remaining subscriber stations move to a new designated rest channel different from the initial designated rest channel.

Figure 3A:
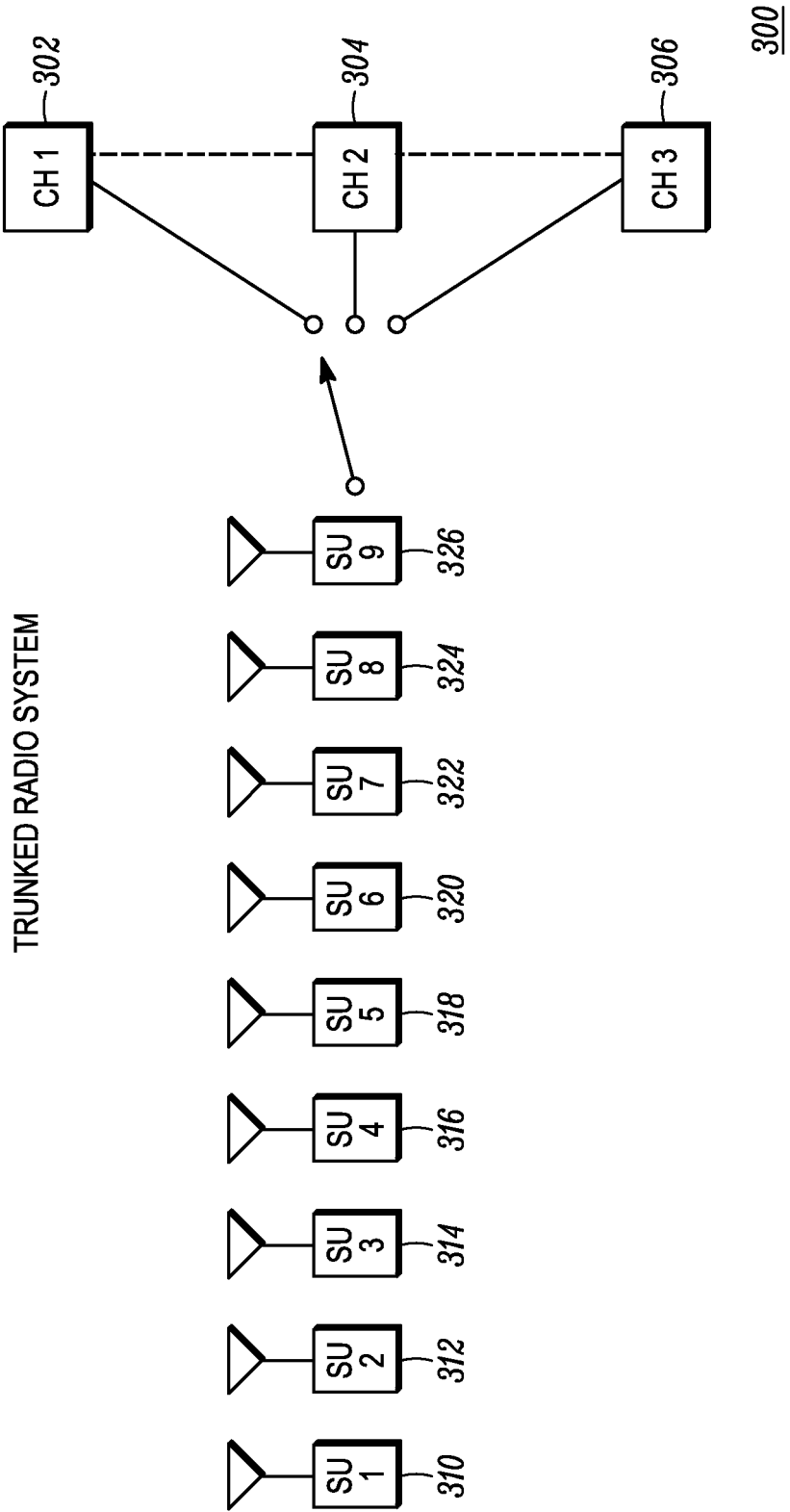
FIGS. 3a through 3d illustrate various decentralized trunked channel assignment operations that may be used at the decentralized trunked radio sites of FIG. 1 in accordance with some embodiments.

As shown in FIG. 3a, an initial configuration of a decentralized trunked radio site 300 may include three channels CH1 302, CH2 304, and CH3 306. Each of the channels CH1-CH3 may correspond to a separate base repeater station. Also included in decentralized trunked radio site 300 is subscriber stations (SUs) SU1 310-SU9 326. Initially, it is assumed that CH1 302 is designated the rest channel (e.g., the channel on which idle subscriber stations are to tune to for new group call information, and which may be identified by a unique synchronization pattern detectable by the SUs). CH1 302 may be designated as a hardcoded default rest channel for decentralized trunked radio site 300, may be elected as an initial rest channel for decentralized trunked radio site 300 via some arbitration procedure between base repeater stations corresponding to channels CH1-CH3, or may be set via some other manner. In other embodiments, CH2 or CH3 could be elected as the initial rest channel for decentralized trunked radio site 300.

Figure 3B:
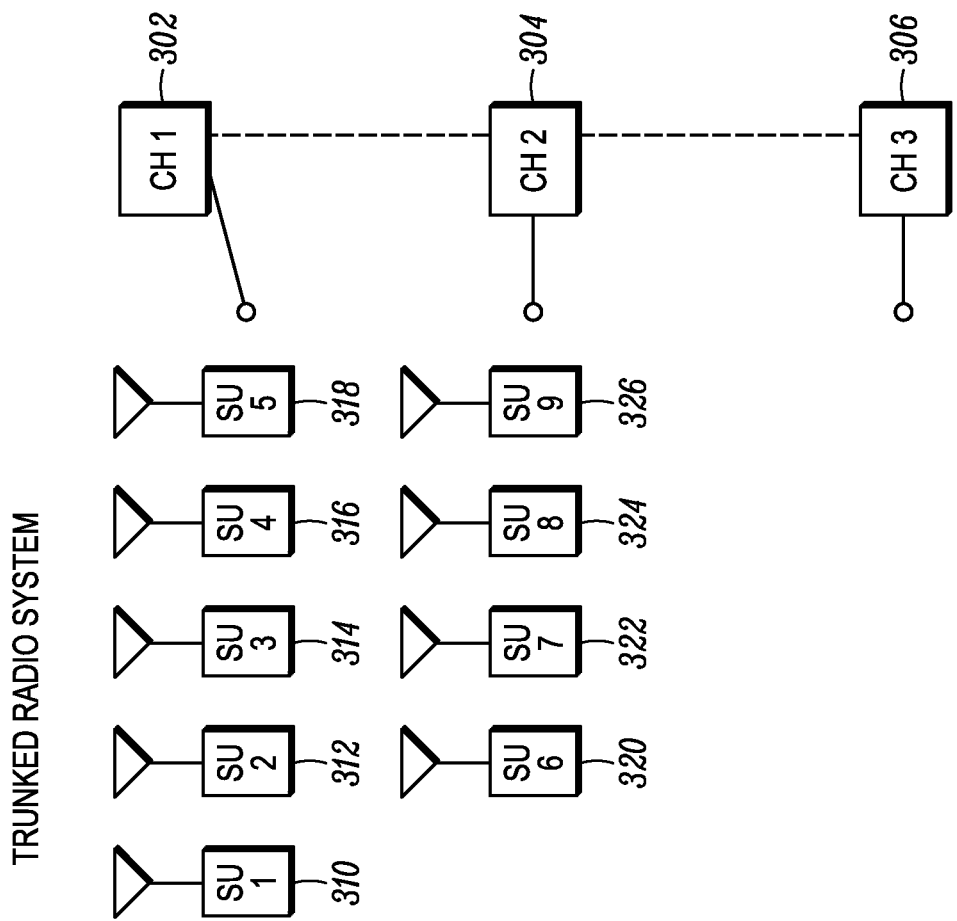

In any event, and as shown in FIG. 3a, all SUs SU1 310-SU9 326 initially detect channel CH1 as the rest channel and idle on rest channel CH1. At some point in time, let us assume that SU6 320 transmits a new call request on rest channel CH1 302. The base repeater station corresponding to rest channel CH1 302 may receive the new call request, determine that CH2 304 is idle and available to handle the new call, and assign the new group call to CH2 304. An announcement is then made on CH1 302 instructing all subscriber stations interested in participating in the new group call to move to the newly assigned traffic channel CH2 304. As shown in FIG. 3b, SUs SU6 320-SU9 326 have moved to the new traffic channel CH2 304 to participate in the new call. Meanwhile, SUs SU1 310-SU5 318, which are not participating in the new call, remain on the initial rest channel CH1 302.

Figure 3C:
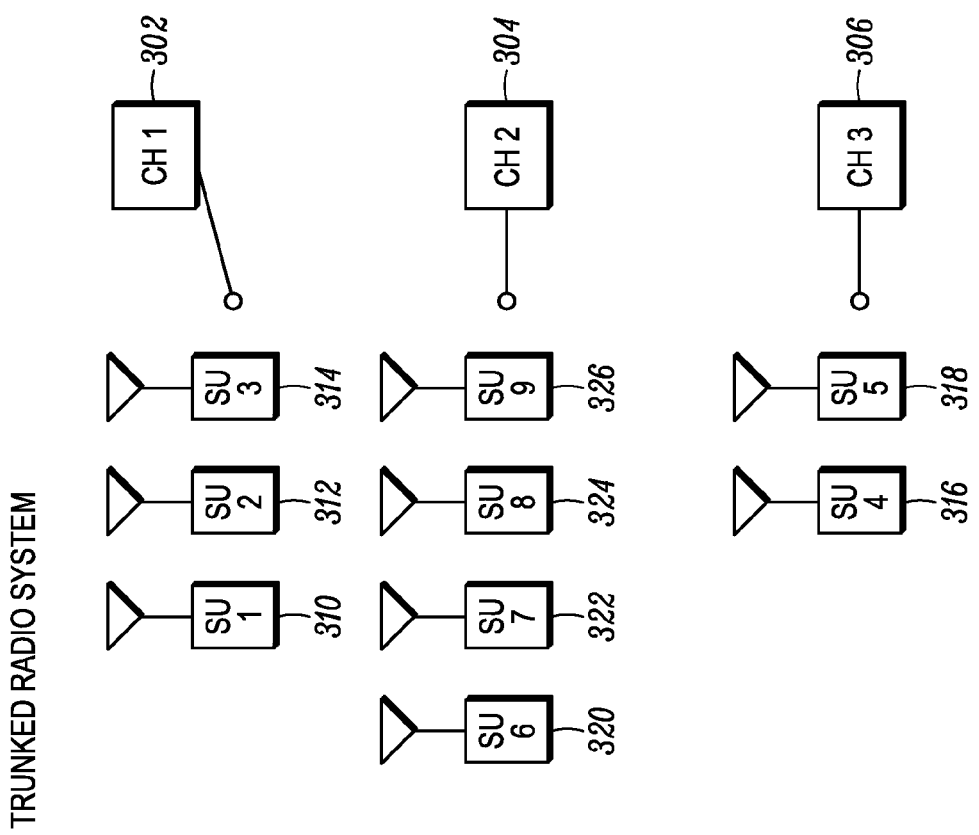

Let us further assume that at some future point in time SU4 316 transmits a second new call request on rest channel CH1 302. The base repeater station corresponding to rest channel CH1 302 may receive the new call request, determine that CH2 304 is busy but that CH3 306 is idle and available to handle the second new call, and assign the second new call to CH3 306. An announcement is then made on CH1 302 instructing all subscriber stations interested in participating in the second new call to move to the newly assigned traffic channel CH3 306. As shown in FIG. 3c, SUs SU4 316-SU5 318 have moved to the new traffic channel CH3 306 to participate in the new call. Meanwhile, SUs SU1 310-SU3 314, which are not participating in the second new call, remain on the initial rest channel CH1 302.

Figure 3D:
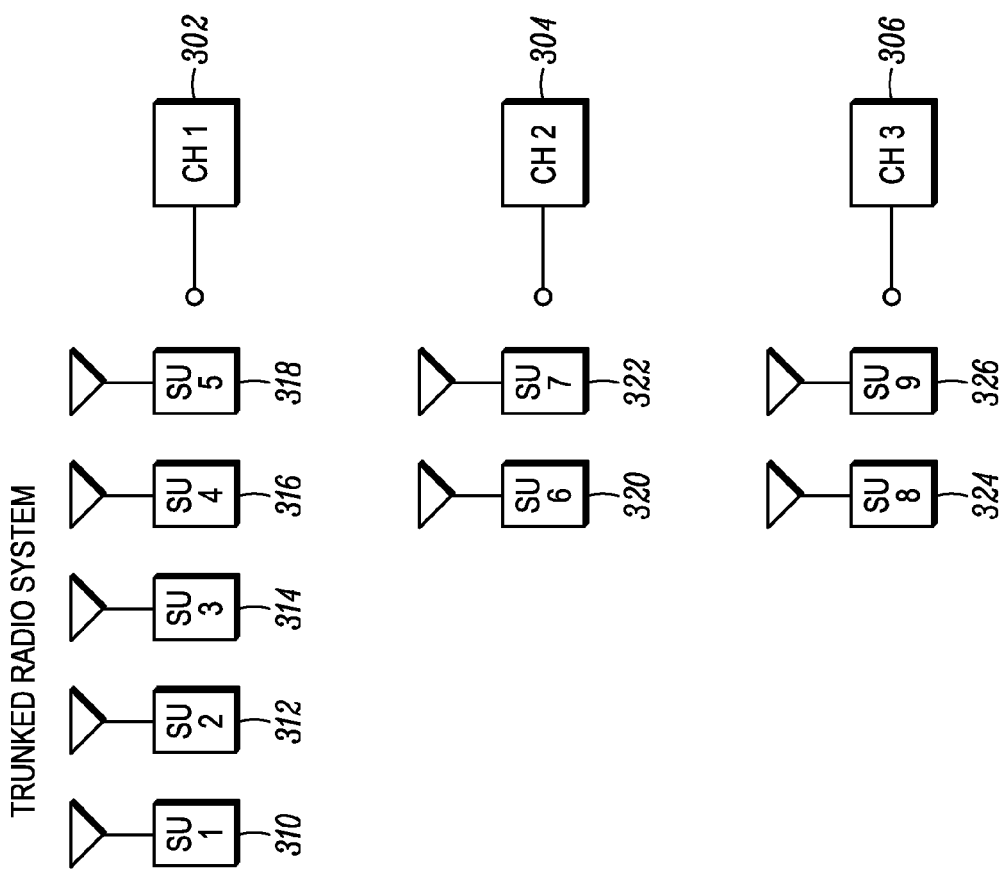

In an alternative way of assigning channels in a decentralized trunked radio system, FIGS. 3a-3b will be relied upon again, but described in a slightly different matter, and FIG. 3d will be relied upon as well. As again shown in FIG. 3a, an initial configuration of a decentralized trunked radio site 300 includes three channels CH1 302, CH2 304, and CH3 306. Initially, it is assumed that CH1 302 is designated the rest channel. CH1 302 may be designated as a hardcoded default rest channel for decentralized trunked radio site 300, may be elected as an initial rest channel for decentralized trunked radio site 300 via some arbitration procedure between base repeater stations corresponding to channels CH1-CH3, or may be set via some other manner. In other embodiments, CH2 or CH3 could be elected as the rest channel for decentralized trunked radio site 300.

In any event, and as shown in FIG. 3a, all SUs SU1 310-SU9 326 initially detect rest channel CH1 and idle on rest channel CH1. At some point in time, let us again assume that SU1 310 transmits a new call request on channel CH1 302. In this case, the rest channel CH1 is automatically assigned as the traffic channel for the new group call. Those subscriber stations wishing to participate in the new group call remain on the rest channel (e.g., now a traffic channel for the new call), and the remaining subscriber stations search out a new rest channel, are instructed by the base repeater station corresponding to channel CH1 302 what the new rest channel will be, or perform some other selection algorithm to determine where to locate the new rest channel. As shown in FIG. 3*b*, SUs SU1 310-SU5 318, which are participating in the new group call, remain on the designated rest channel CH1 302 (e.g., now a traffic channel). SUs SU6 320-SU9 326, meanwhile, have moved to a new rest channel CH2 304 to listen for subsequent new group call notifications.

Let us further assume that at some future point in time SU6 320 transmits a second new group call request on current rest channel CH2 304. In this case, and as before, the current rest channel CH2 304 is automatically assigned as the traffic channel for the second new group call. Those subscriber stations wishing to participate in the second new group call remain on the current rest channel CH2 304 (e.g., now a second traffic channel), and the remaining subscriber stations search out a new rest channel, are instructed by the base repeater station corresponding to channel CH2 304 what the new rest channel will be, or perform some other selection algorithm to determine where to locate the new rest channel. As shown in FIG. 3*d*, SUs SU6 320-SU7 322, which are participating in the second new group call, remain on the current rest channel CH2 304 (e.g., now the second traffic channel). SUs SU8 324-SU9 326, meanwhile, have moved to a new rest channel (in this example, channel CH3 306) to listen for subsequent new group call notifications.

Other examples of decentralized trunked radio site channel distribution and assignment are possible as well. Furthermore, although only three channels are illustrated in FIGS. 3*a*-3*d*, the same concepts can be applied to any number of available channels and/or base repeater stations.

III. Decentralized Trunked Radio Site Operations Over WAN

Figure 4:
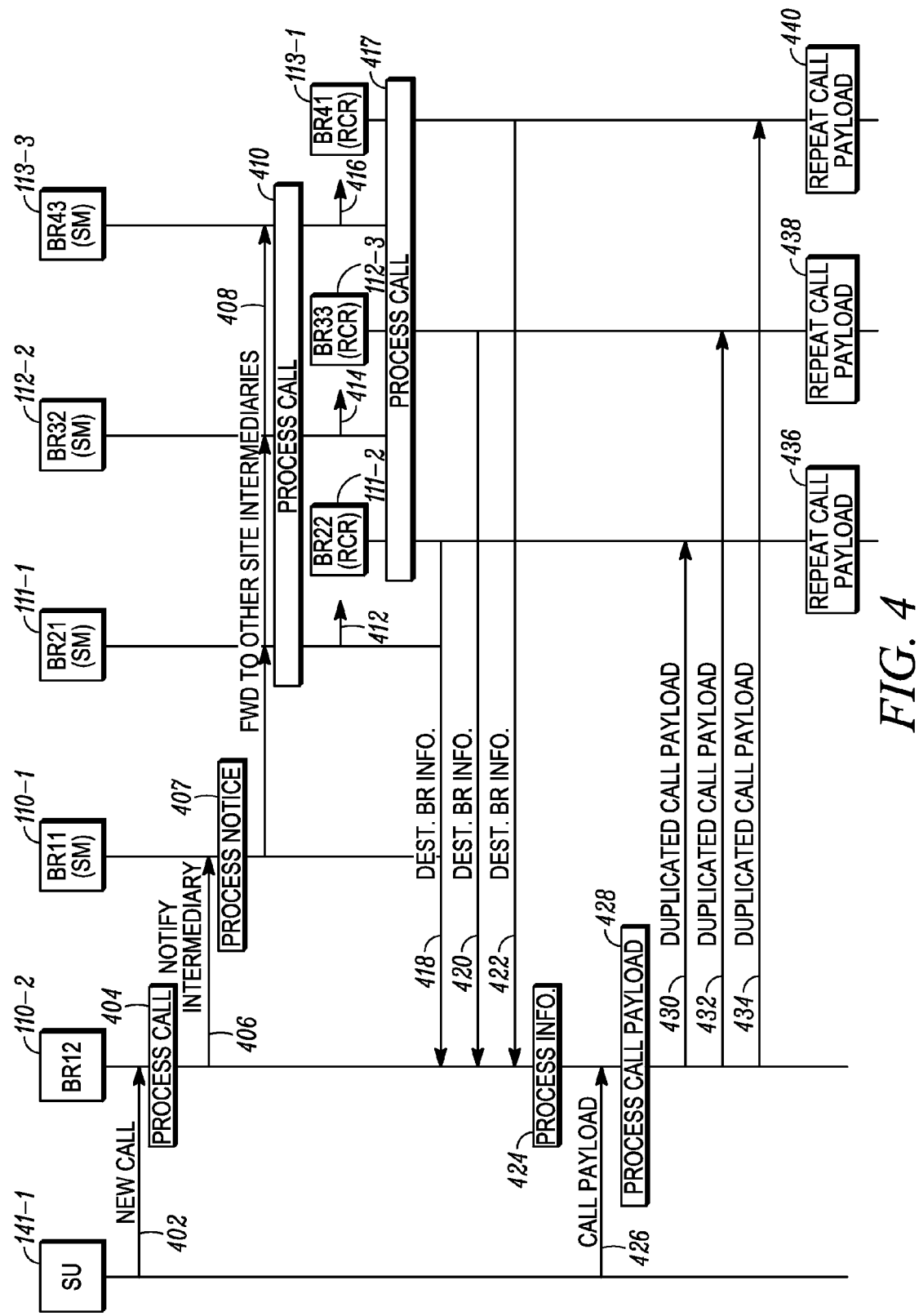
FIG. 4 is a ladder diagram illustrating one example of a new wide area network group call setup in accordance with some embodiments.
Figure 5:
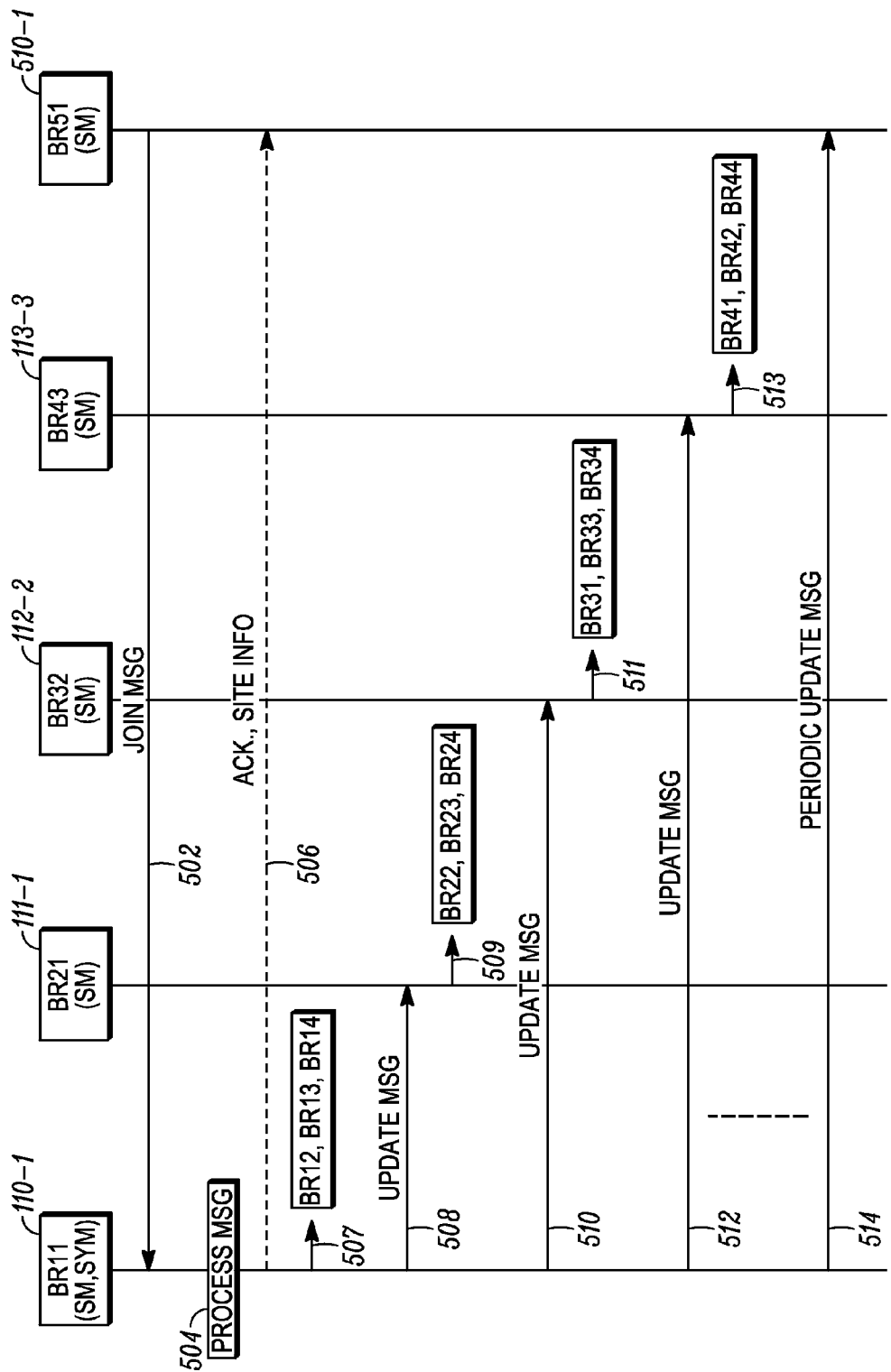
FIG. 5 is a ladder diagram illustrating one example of intermediary information sharing between decentralized trunked radio sites in the wide area network of FIG. 1 in accordance with some embodiments.
Figure 6:
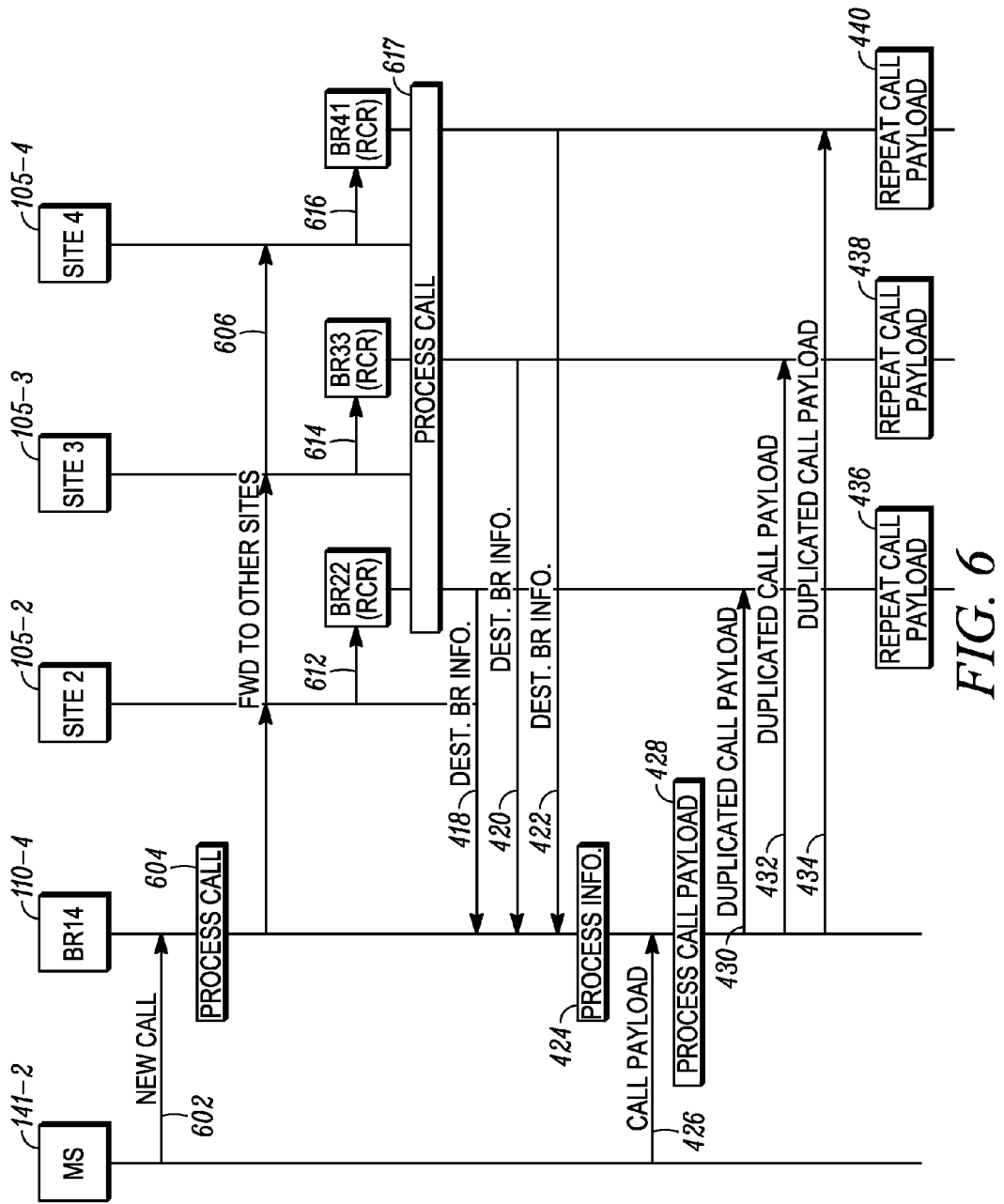
FIG. 6 is a ladder diagram illustrating another example of a new wide area network group call setup in accordance with some embodiments.

FIGS. 4-6 set illustrate several examples of how decentralized trunked radio sites with dynamic rest channels can conduct group calls over the WAN consistent with this disclosure. FIG. 4 describes an embodiment in which intermediary base repeater stations are used in the initial call setup process. FIG. 5 describes an embodiment in which intermediary information is shared amongst site and system intermediary base repeater stations. And FIG. 6 describes an embodiment in which general radio site IP addresses are used in the initial call setup process.

FIG. 4 is a ladder diagram illustrating messages passed between elements of system 100 of FIG. 1, and processes executed at elements of system 100, in order to setup a group call between a plurality of WAN-connected decentralized trunked radio sites having dynamic rest channels.

First, a new call request 402 is transmitted from a subscriber station 141-1 and received at a base repeater station BR12 110-2 at a first radio site 105-1. In this example, base repeater station BR12 110-2 is a non-intermediary rest-channel base repeater station. At step 404, non-intermediary base repeater station BR12 110-2 processes the new call request 402, identifies the intermediary base repeater station BR11 110-1 at radio site 105-1, and forwards a corresponding new call notification 406 to intermediary base repeater station BR11 110-1. The new call notification 402 and/or 406 may include, for example, a source ID identifying the subscriber station 141-1, a destination ID identifying a destination group, a call type (e.g., emergency call, individual or private call, data call, talkgroup call, etc.), and a random number (assigned by one of the non-intermediary base repeater station BR12 110-2 and intermediary base repeater station BR11) for use in arbitrating between multiple new calls associated with the group destination ID.

Also at step 404, and in an embodiment consistent with FIG. 3*c* in which base repeater station BR11 110-1 assigns a new traffic channel for the new call, base repeater station BR11 110-1 may determine an idle base repeater station at radio site 105-1 to handle the new call, and assign the idle base repeater station (for example, perhaps BR14 110-4) to the new group call and transmit a "holding place" message over-the-air notification containing the assigned new traffic channel and a source ID in the header set to a pre-determined reservation-only value (e.g., such as all 0's or all FFFF's). Setting the source ID to the reservation-only value indicates that the channel is conditionally reserved for the call, subject to final allocation after an arbitration time period window has passed and any necessary arbitration with base repeater stations in other remote radio sites has been completed. In an embodiment consistent with FIG. 3*d* in which the rest channel (e.g., the channel associated with rest-channel repeater station BR12 110-2) is automatically assigned as the new traffic channel for a call, base repeater station BR11 110-1 may determine an idle base repeater station (for example, perhaps BR14 110-4) and transmit a similar "holding place" message over-the-air notification containing a contingent new rest channel for subscriber stations not participating in the new call to move to, subject to final allocation after an arbitration time period window has passed and any necessary arbitration with base repeater stations in other remote radio sites has been completed.

At step 404, base repeater station BR12 110-2 may also begin a timer for the arbitration window having a minimum value equal to 2 times the maximum communication delay between radio sites in system 100 and reject any new calls received over the air for the duration of the window. The maximum communication delay between sites may be determined once or periodically via, for example, one or more ping messages transmitted to each of the other sites. The maximum communication delay discovered between radio sites may be stored locally at the intermediary base repeater station BR11 110-1 or duplicated to each base repeater station at the site 105-1, and may be shared with the other radio sites via one or more control messages.

At step 407, site intermediary base repeater station BR11 110-1 processes the forwarded new call notification 406, retrieves the IP address of the site intermediaries at the other radio sites (105-2 through 105-4), and transmits separate new call notifications 408 to each of the site intermediaries (including site intermediary base repeater station BR21 111-1, site intermediary base repeater station BR32 112-2, and site intermediary base repeater station BR43 113-3. In an alternative embodiment in which non-intermediary base repeater station BR12 110-2 has already been provided with IP addresses of site intermediaries at the other radio sites 105-2 through 105-4, base repeater station BR12 110-2 may itself transmit the new call notifications 408 to the other site intermediaries without having to go through local site intermediary BR11 110-1.

At either one of steps 404 or 407, one of the base repeater stations BR12 110-2 and BR11 110-1 may also open a port at the radio site 105-1 firewall (e.g., FNR 125-1 in FIG. 1) so that destination base repeater station information transmitted from other radio sites in response to the new call notifications 408 can be received directly at original source base repeater station BR12 110-2. At step 410, each of the site intermediary base repeater stations BR21 111-1, BR32 112-2, and BR43

113-3 process the new call notification, and identify a current rest channel repeater at each respective radio site 105-2 through 105-4.

For example, at step 410, intermediary base repeater station BR21 111-1 identifies non-intermediary base repeater station BR22 111-2 as the current rest channel repeater (RCR) at radio site 105-2, and forwards the new call notification to the identified rest channel repeater BR22 111-2 via message 412. Similarly, intermediary base repeater station BR32 112-2 identifies non-intermediary base repeater station BR33 112-3 as the current RCR at radio site 105-3, and forwards the new call notification to the identified rest channel repeater BR33 112-3 via message 414. Further, intermediary base repeater station BR43 113-3 identifies non-intermediary base repeater station BR41 113-1 as the current RCR at radio site 105-4, and forwards the new call notification to the identified rest channel repeater BR41 113-1 via message 416.

At step 417, the rest-channel repeaters BR22 111-2, BR33 112-3, and BR41 113-1 individually process the new call notifications. At this step, each of the rest-channel repeaters BR22 111-2, BR33 112-3, and BR41 113-1 may determine whether a call to the same talkgroup identified in the respective new call notifications 412-416 is already active, and if so, may notify (not shown in FIG. 4) the original source base repeater station BR12 110-2. Furthermore, and similar to step 404, each of the rest-channel repeaters BR22 111-2, BR33 112-3, and BR41 113-1 starts an arbitration window timer (whose duration may be 1-3 times the determined maximum communication delay between sites) and rejects any new calls received over the air. Any calls received before the arbitration window (e.g., perhaps during the time it takes for the notification to arrive from the source site) may be assigned a random number for arbitration purposes, and a notice sent to the original source base repeater station BR12 110-2.

At step 417, each of the rest-channel repeaters BR22 111-2, BR33 112-3, and BR41 113-1 may also open respective firewalls FNR 125-2, FNR 125-3, and FNR 125-4 for receiving payload data from the original source base repeater station BR12 110-2.

After step 417, rest-channel repeater BR22 111-2 transmits destination base repeater station information 418 directly back to the original source base repeater station BR12 110-2, perhaps using an IP address provided to rest channel repeater BR22 111-2 via the new call notification messages 402, 406, 408, and 412. The destination base repeater station information 418 may include, in the case of a decentralized trunked radio system in which new group calls are assigned to new traffic channels consistent with FIG. 3c, the IP address of the base repeater station at radio site 105-2 that is associated with the assigned traffic channel for the new call. In another embodiment, the destination base repeater station information 418 may include, in the case of a decentralized trunked radio system in which new group calls are automatically assigned to the current rest channel consistent with FIG. 3d, the IP address of the rest channel base repeater station BR22 111-2 at radio site 105-2 that is automatically assigned as the traffic channel for the new call. Other possibilities exist as well.

Also after step 417, rest-channel repeater BR33 112-3 transmits destination base repeater station information 420 directly back to the original source base repeater station BR12 110-2, perhaps using an IP address provided to rest channel repeater BR33 112-3 via the new call notification messages 402, 406, 408, and 414. The destination base repeater station information 420 may include, in the case of a decentralized trunked radio system in which new group calls are assigned to new traffic channels consistent with FIG. 3c, the IP address of the base repeater station at radio site 105-3 that is associated with the assigned traffic channel for the new call. In another embodiment, the destination base repeater station information 420 may include, in the case of a decentralized trunked radio system in which new group calls are automatically assigned to the current rest channel consistent with FIG. 3d, the IP address of the rest channel base repeater station BR33 112-3 at radio site 105-3 that is automatically assigned as the traffic channel for the new call. Other possibilities exist as well.

Furthermore, and also after step 417, rest-channel repeater BR41 113-1 transmits destination base repeater station information 422 directly back to the original source base repeater station BR12 110-2, perhaps using an IP address provided to rest channel repeater BR41 113-1 via the new call notification messages 402, 406, 408, and 416. The destination base repeater station information 422 may include, in the case of a decentralized trunked radio system in which new group calls are assigned to new traffic channels consistent with FIG. 3c, the IP address of the base repeater station at radio site 105-4 that is associated with the assigned traffic channel for the new call. In another embodiment, the destination base repeater station information 422 may include, in the case of a decentralized trunked radio system in which new group calls are automatically assigned to the current rest channel consistent with FIG. 3d, the IP address of the rest channel base repeater station BR41 113-1 at radio site 105-4 that is automatically assigned as the traffic channel for the new call. Other possibilities exist as well.

In an alternative embodiment, site intermediaries BR11 110-1, BR21 111-1, BR32 112-2, and BR43 113-3 may instead transmit the respective destination base repeater station information messages 418, 420, and 422, and/or may instead open respective firewalls FNR 125-2, FNR 125-3, and FNR 125-4 for receiving payload data from the original source base repeater station BR12 110-2.

At step 424, the original source base repeater station BR12 110-2 processes each of the destination base repeater information messages 418-422 (and any other subsequent messages, perhaps regarding new call requests for the same group, not shown in FIG. 4). For example, base repeater station BR12 110-2 may record the destination IP addresses of the traffic channel repeaters assigned to the new group call (which may include what were previously rest-channel repeaters at the destination radio sites) for use in directly transmitting group call payloads to the correct base repeater station at each radio site via the WAN. Base repeater station BR12 110-2 may also review any previous, current, or subsequent new group call requests received from other base repeater stations and included in the destination base repeater information messages 418-422 or subsequent messages during an arbitration time period window. If other base repeater stations received a new call request with a destination group ID equivalent to the destination group ID of the new call request transmitted in call request 402, base repeater station BR12 110-2 may coordinate and/or arbitrate, alone or with the aid of the other base repeater stations, to determine which source subscriber station's new call request should be granted (and which should be denied), using an algorithm at least partially dependent upon the random number assigned to the new call requests by the respective base repeater stations. Assuming that either no other new call requests are received, or that other new call requests are received but that the new call request contained in new call request 402 is granted over the other new call requests, base repeater station BR12 110-2 may transmit an over-the-air message at step 424 indicating that the subscriber station 141-1 has been granted permission to proceed with the new group call associated with the new call request 402. The over-the-air message transmitted at step 424 may differ from the message transmitted at step 404 in that the header of the message transmitted at step 424 now contains a valid source ID (e.g., a source ID associated with subscriber station 141-1).

Subsequently, base repeater station BR12 110-2 may begin receiving payload data 426 associated with the new group call from subscriber station 141-1. At step 428, base repeater station BR12 110-2 processes the payload data, including retrieving the IP addresses of the target traffic channel repeaters stored at step 424 and perhaps repeating the payload data over-the-air at radio site 105-1 on an outbound channel assigned to base repeater station BR12 110-2 or some other base repeater station at radio site 105-1. The payload data may include, for example, audio, video, audio/video, images, and/or text, among other possibilities. Base repeater station BR12 110-2 then transmits duplicated payload transmissions to the target traffic channel base repeater stations at the other radio sites participating in the new group call (as indicated in the respective destination base repeater station information messages 418, 420, and 422) via respective unicast transmissions 430, 432, and 434.

Upon receipt of the duplicated call payload data 430, base repeater station BR22 111-2 (e.g., the assigned traffic channel repeater at site 105-2) repeats the received payload data over an outbound channel assigned to the base repeater station BR22 111-2 at step 436. Similarly, and upon receipt of the duplicated call payload data 432, base repeater station BR33 112-3 (e.g., the assigned traffic channel repeater at site 105-3) repeats the received payload data over an outbound channel assigned to the base repeater station BR33 112-3 at step 438. Furthermore, and upon receipt of the duplicated call payload data 432, base repeater station BR41 113-1 (e.g., the assigned traffic channel repeater at site 105-4) repeats the received payload data over an outbound channel assigned to the base repeater station BR41 113-1 at step 438. Further transmissions between subscriber station 141-1 and other group call members at radio sites 105-n can be executed using the already-allocated resources at each site and can be executed without the need to further involve the intermediary devices.

FIG. 5 is a ladder diagram illustrating one method in which a new decentralized trunked radio site, for example added to system 100 of FIG. 1, is provided with information necessary to participate in group calls over the WAN and further illustrates how intermediary information can be periodically or intermittently shared within system 100. For example, assume that a new radio site in system 100 is added including a new base repeater station BR51 510-1 that is assigned to, or is elected to, act as a site intermediary for the new radio site. As shown in FIG. 5, new base repeater station BR51 510-1 will be pre-provisioned with the static IP address of the base repeater station BR11 110-1 that is acting as the system-wide intermediary for system 100. Upon power-up or some other event, base repeater station BR51 510-1 is configured to retrieve the pre-provisioned IP address of the system-wide intermediary, and transmit a join message 502 to the system-wide intermediary (in this case, base repeater station BR11 110-1). Upon receiving the join message 502, base repeater station BR11 110-1 processes the message at step 504. For example, base repeater station BR11 110-1 may store the static IP address of base repeater station BR51 510-1 provided in the join message 502 at step 504. Furthermore, base repeater station BR11 110-1 may generate an acknowledgement and/or radio site information message at step 504 including static IP addresses of all other radio site intermediary base repeater stations (including, for example, base repeater station BR11 110-1 at radio site 105-1, base repeater station BR22 111-2 at radio site 105-2, base repeater station BR32 112-2 at radio site 105-3, and base repeater station BR43 113-3 at radio site 105-4). The acknowledgement and/or radio site information message may be transmitted back to the new base repeater station BR51 510-1 via message 506.

In response to receiving the join message 502, base repeater station BR11 110-1 may additionally generate updated radio site information at step 504 to include the new site intermediary base repeater station BR51 510-1, and transmit a corresponding update message 507 to each other non-intermediary base repeater station at the radio site 105-1 (including base repeater stations BR12 110-2, BR13 110-3, and BR 14 BR14 110-4). Base repeater station BR11 110-1 may also transmit corresponding update messages 508, 510, and 512 to respective site intermediary base repeater stations BR21 111-1, BR32 112-2, and BR43 113-3 so that the other radio sites may be apprised of the newly added radio site associated with new base repeater station BR51 510-1. Each site intermediary base repeater station BR21 111-1, BR32 112-2, and BR43 113-3 may similarly provide local update messages 509, 511, and 513 so that non-intermediary base repeater stations at respective radio sites 105-2, 105-3, and 105-4 may receive updated site intermediary information. Future new call requests originating at radio sites 105-1 through 105-4 could then be copied and provided to the new base repeater station BR51 510-1.

Furthermore, base repeater station BR11 110-1 may be configured to periodically and/or intermittently transmit update messages, such as update message 514, to each of the site intermediaries it has knowledge of in order to provide updated IP addresses and/or other network information to site intermediaries such as base repeater stations BR21 111-1, BR32 112-2, BR43 113-3, and BR51 510-1. The transmission of update message 514 may also be triggered by some other event, such as a change of IP address or other network information for a site intermediary at one of the radio sites 105-n, a change of IP address or other network information for the system-wide intermediary (e.g., base repeater station BR11 110-1), or by some other event.

FIG. 6 is a ladder diagram illustrating messages passed between elements of system 100 of FIG. 1, and processes executed at elements of system 100, in order to setup a group call between a plurality of WAN-connected decentralized trunked radio sites having dynamic rest channels in accordance with an alternative embodiment in which intermediary base repeater stations become optional.

First, a new call request 602 is transmitted from a subscriber station 141-2 and received at base repeater station BR14 110-4. Base repeater station BR14 110-4 may or may not be an intermediary base repeater station for radio site 105-1 in this example. Rather, in this example, each of the base repeater stations BR11 110-1 through BR14 110-4 are provided (separately or perhaps via a radio site intermediary at radio site 105-1) with IP addresses associated with all other radio sites in system 100 (e.g., radio sites 105-2, 105-3, and 105-4 in the example of FIG. 1). The IP addresses associated with each other radio site may be a site-wide IP address that is associated with (and decoded by) each base repeater station at each respective radio site (e.g., perhaps implemented via use of a packet-repeating Ethernet hub at each radio site). In this case, because each base repeater station is configured to decode transmissions sent to the site-wide IP address, a current rest-channel base repeater station can accept and decode packets intended for it, while other base repeater stations drop the packets (before or after decoding it). In another example, the IP addresses associated with each radio site may be a last-used IP address (e.g., perhaps implemented via use of a network switch at each radio site). The last-used IP address is most likely to be the rest channel repeater at each respective radio site due to the rest channel repeater's periodic transmission of keep-alive messages. In the event that the last-used IP address at a radio site is not associated with a current rest channel repeater, the device receiving the packet may be configured to forward the packet to the current rest channel repeater at the site.

The new call notification 602 may include, for example, a source ID identifying the subscriber station 141-1, a destination ID identifying a destination group, a call type, and a random number (assigned by the base repeater station BR14 110-4) for use in arbitrating between multiple new calls associated with the group destination ID.

Also at step 604, and in an embodiment consistent with FIG. 3c in which base repeater station BR14 110-4 assigns a new traffic channel for the new call, base repeater station BR14 110-4 may determine an idle base repeater station at radio site 105-1 to handle the new call, and assign the idle base repeater station (for example, perhaps BR13 110-3) to the new group call and transmit a "holding place" message over-the-air notification containing the assigned new traffic channel and a source ID in the header set to a pre-determined reservation-only value (e.g., such as all 0's or all FFFF's). In an embodiment consistent with FIG. 3d in which the rest channel (e.g., the channel associated with rest-channel repeater station BR14 110-4) is automatically assigned as the new traffic channel for a call, base repeater station BR14 110-4 may determine an idle base repeater station (for example, perhaps BR13 110-3) and transmit a similar "holding place" message over-the-air notification containing a contingent new rest channel for subscriber stations not participating in the new call to move to, subject to final allocation after an arbitration time period window has passed and any necessary arbitration with base repeater stations in other remote radio sites has been completed.

At step 604, base repeater station BR14 110-4 may also begin a timer for the arbitration window having a minimum value equal to 2 times the maximum communication delay between radio sites in system 100 and reject any new calls received over the air for the duration of the window.

Also at step 604, base repeater station BR14 110-4 may retrieve the IP address (site IP or most recently used IP, for example) of the other radio sites (105-2 through 105-4), and transmit separate new call notifications 606 to each of the other radio sites (including radio sites 105-2, 105-3, and 105-4). Base repeater station BR14 110-4 may also open a port at the radio site 105-1 firewall (e.g., FNR 125-1 in FIG. 1) so that destination base repeater station information transmitted from other radio sites in response to the new call notifications 606 can be received directly at original source base repeater station BR14 110-4. At each of the radio sites 105-2 through 105-4, all base repeater stations receive the forwarded call request messages 606, and at each radio site, a current rest channel repeater (RCR) receives the forwarded call request message 606 (via duplicated messages 612, 614, and 616 perhaps generated via a hub device at each radio site), recognizes the message as one which it should decode, and respectively processes the forwarded call request message 606 at step 617. Base repeater stations at each radio site other than the current rest channel repeater may be configured to discard new call requests with or with decoding the entire new call request message (e.g., perhaps via a header decoding or partial payload snooping process).

At step 617, the rest-channel repeaters BR22 111-2, BR33 112-3, and BR41 113-1 individually process the new call notifications. At this step, each of the rest-channel repeaters BR22 111-2, BR33 112-3, and BR41 113-1 may determine whether a call to the same talkgroup identified in the respective new call notifications 612-616 is already active, and if so, may notify (not shown in FIG. 6) the original source base repeater station BR14 110-4. Furthermore, and similar to step 604, each of the rest-channel repeaters BR22 111-2, BR33 112-3, and BR41 113-1 starts an arbitration window timer (whose duration may be 1-3 times the determined maximum communication delay between sites) and rejects any new calls received over the air. Any calls received before the arbitration window may be assigned a random number for arbitration purposes, and a notice sent to the original source base repeater station BR14 110-4.

At step 617, each of the rest-channel repeaters BR22 111-2, BR33 112-3, and BR41 113-1 may also optionally open respective firewalls FNR 125-2, FNR 125-3, and FNR 125-4 for receiving payload data from the original source base repeater station BR14 110-4. In some embodiments, the original source base repeater station BR14 110-4 may continue to use the IP address for the sites 105-2 through 105-4 without the need to further provide openings in respective firewalls FNR 125-2 through 125-4 to directly address the rest channel repeaters BR22 111-2, BR33 112-3, and BR41 113-1.

After step 617, communications between the original source base repeater station BR14 110-4 and the assigned traffic channel repeaters at the radio sites 105-2 through 105-4 may proceed as set forth in FIG. 4 (whose reference numbers have been duplicated in FIG. 6 for completeness). In some embodiments, and as mentioned above, site-wide IP addresses may be continued to be used instead of direct, individual IP addresses for each base repeater station. For example, in one embodiment, the destination base repeater information messages 418-422 may be transmitted to an IP address associated with radio site 105-1, requiring BR14 110-4 to decode and determine that it is the intended recipient of the messages (and other base repeater stations to at least partially decode and drop such packets). Similarly, duplicated call payload messages 430-434 could, in one embodiment, be similarly transmitted to site-wide IP addresses associated with radio sites 105-2 through 105-4, similar to the method in which the new call request 606 was provided to radio sites 105-2 through 105-4. While the end result of the transmission is the same, the mechanism for getting a particular packet from original source base repeater station BR14 110-4 and assigned traffic channel repeater at radio sites 105-2 through 105-4 (and vice versa) may differ, and is entirely within the scope of this disclosure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operation of repeaters within a distributed peer to peer wide area trunked radio network, the wide area network comprising a plurality of network locations, each network location consisting of a plurality of repeaters in which a dynamically selected one of the repeaters out of the plurality acts as a rest channel repeater for announcing new incoming calls to idling subscriber stations at the respective network location, the method comprising:

receiving a new group call request at a first repeater at a first network location from a first subscriber station, and the first repeater responsively:

causing corresponding new group call notifications to be transmitted to each of the other network locations via one or more first messages transmitted over the wide area network to the dynamically selected one of the repeaters acting as a rest channel repeater at each of the other network locations in the plurality;

receiving, from each of the other network locations, and via one or more second messages transmitted over the wide area network, an identity of a traffic channel repeater that will be hosting the new call at the respective other network location;

transmitting an over-the-air notification to other subscriber stations at the first network location on a first rest channel identifying one of the first rest channel and another available channel as a channel that is associated with the new group call;

the first repeater receiving data associated with the new call from the first subscriber station, and transmitting duplicates of the data to each of the identified traffic channel repeaters at each of the other network locations via the wide area network.

2. The method of claim 1, wherein the over-the-air notification identifies the first rest channel as the traffic channel for the new call and identifies a second rest channel at the first network location that will act as a new rest channel for subscriber stations at the first network location not participating in the new group call.

3. The method of claim 1, wherein the over-the-air notification identifies a new traffic channel, different from the first rest channel, for use by subscriber stations at the first network location that will be participating in the new group call.

4. The method of claim 1, wherein the first repeater is an intermediary repeater at the first network location, and a static network address for an intermediary repeater at each of the other network locations in the plurality is stored at the first repeater and is used by the first repeater for transmitting the new group call notifications to the current rest channel repeaters at each of the other network locations in the plurality.

5. The method of claim 1, wherein the first repeater is not an intermediary repeater at the first network location, and the first repeater causing the new group call notifications to be transmitted to each of the other network locations comprises identifying the intermediary repeater at the first network location and transmitting a message to the intermediary repeater at the first network location informing the intermediary repeater at the first network location of the new call request.

6. The method of claim 1, wherein the identity of a traffic channel repeater that will be hosting the new call at the respective other network locations is received from each of the intermediary repeaters at each of the other network locations, and wherein each of the identified traffic channel repeaters was a rest channel repeater for each of the respective other network locations prior to hosting the new call, and wherein new respective rest channels are announced at each of the respective other network locations to which subscriber stations at each of the respective other network locations not participating in the new group call are instructed to move.

7. The method of claim 1, further comprising the first repeater receiving the data associated with the new call from the first subscriber station, and repeating the data over-the-air to subscriber stations in the first network location.

8. The method of claim 1, further comprising:
the first repeater, after transmitting the corresponding new group call notifications to each of the other network locations, starting an arbitration window timer;
prior to the end of the arbitration window timer, the first repeater receiving from at least a particular other network location an identity of a traffic channel repeater that either already has a second active call for the same talkgroup as the new group call or has recently received a request to begin a second active call for a same talkgroup as the new group call; and
the first repeater, in cooperation with the traffic channel repeater at the particular other network location, arbitrating which call should be selected for the same talkgroup.

9. The method of claim 8, wherein, during the arbitration window, the first repeater transmitting a first over-the-air notification to other subscriber stations at the first network location on a first rest channel identifying one of the first rest channel and another available channel as a channel that is associated with the new group call, the first over-the-air notification not identifying a source subscriber station for the new group call; and
after the arbitration window, the first repeater transmitting a second over-the-air notification to other subscriber stations at the first network location on a first rest channel again identifying the one of the first rest channel and the another available channel as the channel that is associated with the new group call, the second over-the-air notification this time identifying the source subscriber station for the new group call as the first subscriber station.

10. The method of claim 1, wherein the first repeater transmitting duplicates of the data to each of the identified traffic channel repeaters at each of the other network locations comprises transmitting the duplicated data directly to each of the identified traffic channel repeaters at each of the other network locations, without the duplicated data having to pass through either a respective intermediary repeaters at respective ones of the other network locations or other repeaters at respective ones of the other network locations not supporting the new group call.

11. The method of claim 1, wherein the first repeater causing corresponding new group call notifications to be transmitted to each of the other network locations comprises transmitting new group call notifications to single respective IP addresses associated with, and monitored by, every repeater device at each of the respective other network locations.

12. The method of claim 1, wherein the wide area network comprises at least the Internet.

13. The method of claim 1, further comprising a designated intermediary repeater at the first network location intermittently or periodically transmitting keep-alive messages to each of the designated intermediary repeaters at each of the other network locations in the plurality in order to maintain respective open network connections between intermediary repeaters and through intervening firewalls.

14. The method of claim 1, further comprising the first repeater station intermittently or periodically transmitting keep-alive messages to each of the identified traffic channel repeaters at each of the other network locations, only while the new group call is active, in order to maintain respective open network connections between the first repeater station and the identified traffic channel repeaters during the call; and
after the new group call is terminated, the first repeater station refraining from transmitting keep-alive messages to each of the identified traffic channel repeaters at each of the other network locations in order to close firewall openings associated with the new group call.

15. The method of claim 1, wherein at least one particular intermediary repeater at the first network location or at one of the other network locations acts as a system-wide site intermediary, and stores IP addresses for each of the site intermediates at each of the first network location and other network locations, and in response to receiving a request from a new site intermediary, updates the stored IP addresses to include an IP address of the new site intermediary and provides a copy of the stored IP addresses for each of the site intermediates to the new site intermediary.

16. A first repeater at a first network location within a distributed peer to peer wide area trunked radio network, the wide area network comprising a plurality of network locations, each network location consisting of a plurality of repeaters in which a dynamically selected one of the repeaters out of the plurality acts as a rest channel repeater for announcing new incoming calls to idling subscriber stations at the respective network location, the first repeater comprising:
a receiver;
a transmitter;
a processor; and
a computer readable medium having instructions stored thereon that, in response to execution by the processor, cause the first repeater to perform operations comprising:
receiving, via the receiver, a new group call request from a first subscriber station;
responsive to receipt of the new group call request causing, via the transmitter, corresponding new group call notifications to be transmitted to each of the other network locations via one or more first messages transmitted over the wide area network to the dynamically selected one of the repeaters acting as a rest channel repeater at each of the other network locations in the plurality;
receiving, via the receiver, from each of the other network locations, and via one or more second messages transmitted over the wide area network, an identity of a traffic channel repeater that will be hosting the new call at the respective other network location;
transmitting, via the transmitter, an over-the-air notification to other subscriber stations at the first network location on a first rest channel identifying one of the first rest channel and another available channel as a channel that is associated with the new group call;
receiving, via the receiver, data associated with the new call from the first subscriber station; and transmitting, via the transmitter, duplicates of the data to each of the identified traffic channel repeaters at each of the other network locations via the wide area network.

17. The first repeater of claim 16, wherein the over-the-air notification identifies the first rest channel as the traffic channel for the new call and identifies a second rest channel at the first network location that will act as a new rest channel for subscriber stations at the first network location not participating in the new group call.

18. The first repeater of claim 16, wherein the over-the-air notification identifies a new traffic channel, different from the first rest channel, for use by subscriber stations at the first network location that will be participating in the new group call.

19. The first repeater of claim 16, wherein the first repeater is an intermediary repeater at the first network location, and a static network address for an intermediary repeater at each of the other network locations in the plurality is stored in the memory and is used by the first repeater for transmitting the new group call notifications to the current rest channel repeaters at each of the other network locations in the plurality.

20. The first repeater of claim 16, wherein the first repeater is not an intermediary repeater at the first network location, and the first repeater causing the new group call notifications to be transmitted to each of the other network locations comprises identifying the intermediary repeater at the first network location and transmitting a message to the intermediary repeater at the first network location informing the intermediary repeater at the first network location of the new call request.

\* \* \* \* \*

UNITED STATES PATENT AND TRADEMARK OFFICE
CERTIFICATE OF CORRECTION

PATENT NO. : 8,755,742 B2
APPLICATION NO. : 13/253132
DATED : June 17, 2014
INVENTOR(S) : Satyanarayan R. Panpaliya et al.

It is certified that error appears in the above-identified patent and that said Letters Patent is hereby corrected as shown below:

IN THE SPECIFICATION:

In Column 14, Line 15, delete "BR 14 BR14 110-4)." and insert -- BR14 110-4). --, therefor.

Signed and Sealed this
Third Day of May, 2016

Michelle K. Lee
*Director of the United States Patent and Trademark Office*